United States Patent
Fukuda et al.

(10) Patent No.: US 9,753,161 B2
(45) Date of Patent: Sep. 5, 2017

(54) NEUTRON SCINTILLATOR AND NEUTRON DETECTOR

(71) Applicant: TOKUYAMA CORPORATION, Shunan-shi, Yamaguchi (JP)

(72) Inventors: Kentaro Fukuda, Shunan (JP); Takahiro Yoshida, Shunan (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 0 days.

(21) Appl. No.: 15/306,384

(22) PCT Filed: Jun. 8, 2015

(86) PCT No.: PCT/JP2015/066522
§ 371 (c)(1),
(2) Date: Oct. 24, 2016

(87) PCT Pub. No.: WO2015/190444
PCT Pub. Date: Dec. 17, 2015

(65) Prior Publication Data
US 2017/0052265 A1 Feb. 23, 2017

(30) Foreign Application Priority Data

Jun. 9, 2014 (JP) ................ 2014-118310

(51) Int. Cl.
*G01T 1/20* (2006.01)
*G01T 3/06* (2006.01)
(Continued)

(52) U.S. Cl.
CPC .............. *G01T 3/06* (2013.01); *C09K 11/02* (2013.01); *C09K 11/7733* (2013.01); *C09K 11/7773* (2013.01); *G01T 1/20* (2013.01)

(58) Field of Classification Search
CPC .. G01T 3/06; G01T 1/20; C09K 11/02; C09K 11/7733; C09K 11/7773
USPC .................................................. 250/361 R
See application file for complete search history.

(56) References Cited

U.S. PATENT DOCUMENTS 8,642,972 B2    2/2014 Fukuda et al.
2007/0096114 A1*  5/2007 Aoki ............... H01L 33/486
                                                        257/79
(Continued)

FOREIGN PATENT DOCUMENTS

EP    0 506 585 A1    9/1992
JP    5-78658 A       3/1993
(Continued)

OTHER PUBLICATIONS

Hishinuma et al., "Growth and luminescence properties of Ce, Ca co-doped $LiGdF_4$—LiF eutectics", <The 61st> JSAP Spring Meeting Extended Abstracts, Mar. 17, 2014, p. 15-002.
(Continued)

*Primary Examiner* — David Porta
*Assistant Examiner* — Abra Fein
(74) *Attorney, Agent, or Firm* — Birch, Stewart, Kolasch & Birch, LLP

(57) ABSTRACT

A neutron scintillator excellent in neutron detection efficiency and n/γ discrimination ability, having uniform characteristics, and easily available in a large size is provided. The neutron scintillator comprises a resin composition having eutectic particles incorporated in a resin having a similar refractive index, the eutectic particles having a sphere equivalent diameter of the order of 50 to 1000 μm and being composed of lithium fluoride and an inorganic fluorescent material, such as $MgF_2$, $CaF_2$ or $SrF_2$, the inorganic fluorescent material containing a lanthanoid, such as Ce, Pr, Nd, Sm, Eu, Gd, Tb, Dy, Ho, Er, Tm or Yb, as a luminescent center atom.

20 Claims, 4 Drawing Sheets

(51) Int. Cl.
*C09K 11/02* (2006.01)
*C09K 11/77* (2006.01)

(56) References Cited

U.S. PATENT DOCUMENTS

| | | | | |
|---|---|---|---|---|
| 2013/0183509 A1* | 7/2013 | Fukuda | ................ | C09K 11/772 |
| | | | | 428/216 |
| 2015/0307777 A1* | 10/2015 | Fukuda | .................... | G01T 3/06 |
| | | | | 250/390.11 |

FOREIGN PATENT DOCUMENTS

| | | | |
|---|---|---|---|
| JP | 11-237498 | A | 8/1999 |
| JP | 2002-333482 | A | 11/2002 |
| JP | 2007-24629 | A | 2/2007 |
| JP | 5501088 | B2 | 5/2014 |

OTHER PUBLICATIONS

International Preliminary Report on patentability for PCT/JP2015/066522 (PCT/IPEA/409) dated Jun. 7, 2016.
International Search Report for PCT/JP2015/066522 mailed on Jul. 14, 2015.
Sugimoto et al., "Study on neutron detector using a rubber dispersing small pieces of LiCaAlF$_6$ scintillator", <The 74th> JSAP Autumn Meeting Extended Abstracts, Sep. 13, 2013, p. 02-044.
Written Opinion of the International Searching Authority for PCT/JP2015/066522 (PCT/ISA/237) mailed on Jul. 14, 2015.

* cited by examiner

NEUTRON SCINTILLATOR AND NEUTRON DETECTOR

TECHNICAL FIELD

This invention relates to a neutron scintillator, and a neutron detector using the neutron scintillator. More specifically, the invention relates to a neutron scintillator comprising a resin composition containing eutectic particles of lithium fluoride and an inorganic fluorescent material.

BACKGROUND ART

A neutron detector is an elemental technology underlying neutron utilization technologies. A neutron detector of higher performance is desired with the development of neutron utilization technologies in security fields such as cargo inspection, academic and research fields such as structure analysis by neutron diffraction, nondestructive inspection fields, or medical fields such as boron neutron capture therapy.

Neutron detection efficiency and the ability to discriminate between a neutron and a gamma ray (may hereinafter be referred to as neutron-gamma or n/γ discrimination ability) are named as important characteristics required of a neutron detector. The neutron detection efficiency is the ratio of the number of neutrons counted by the detector to the number of neutrons entering the detector. When the detection efficiency is low, the absolute number of the neutrons measured is small and the accuracy of measurement lowers.

A γ-ray exists in the natural world as natural radiation, and also occurs when a neutron hits a constituent member of a detection system for detecting a neutron, or when a neutron collides with an object to be inspected. If the n/γ discrimination ability is low, therefore, a γ-ray is counted as a neutron, so that the accuracy of neutron counting declines.

The present inventors have proposed, as a scintillator excellent in the above-mentioned neutron detection efficiency and n/γ discrimination ability, a neutron scintillator comprising a eutectic having layered lithium fluoride crystals and layered calcium fluoride crystals stacked in a specific structure (see Patent Document 1).

A eutectic comprising lithium fluoride and an inorganic fluorescent material and having a characteristic texture structure can be used as a neutron scintillator.

In the eutectic described in Patent Document 1, the inorganic fluorescent material is calcium fluoride crystals, and the form of the texture structure is a layered structure. In such a eutectic, Li-6 isotope in the LiF causes a capture reaction with a neutron, and a secondary particle resulting from the reaction imparts its energy to the inorganic fluorescent material to cause light emission, thereby acting as a neutron scintillator.

A neutron scintillator comprising the above eutectic is advantageous in that it has a high detection efficiency for neutrons and excels in n/γ discrimination ability. However, it has been difficult to obtain a eutectic having a uniform texture structure, and the resulting scintillator has posed the problem that its characteristics tend to be nonuniform. Concretely, there have been problems such that in the above exemplified layered structure, the thickness of the layers is not uniform, the layered structure itself is not uniform, and the orientation of the layers is different.

To solve the above-mentioned problems, Patent Document 1 proposes that a eutectic having a uniform texture structure be obtained by a unidirectional solidification process using the Bridgman method, the temperature gradient solidification method, the Czochralski method, or the micro-pulling-down method, and the resulting eutectic be used in a neutron scintillator.

Even when such a unidirectional solidification process is used, however, it is quite difficult to obtain a eutectic of a homogeneous texture structure efficiently and reproducibly. Furthermore, an apparatus for use in this method has the problems of being expensive and requiring a lengthy time for production, and leaves room for improvement in the reduction of a manufacturing cost.

Besides, the eutectic has the following problems: Lithium fluoride and calcium fluoride, which are the constituent components of the eutectic, have different thermal expansion coefficients. Thus, cracking due to distortion is apt to occur in a cooling process during production. This makes it difficult to produce a large-sized scintillator.

PRIOR ART DOCUMENTS

Patent Documents

Patent Document 1: Japanese Patent No. 5501088

SUMMARY OF THE INVENTION

Problems to be Solved by the Invention

The present invention has been accomplished with a view to solving the above problems.

It is an object of the invention to provide a technology ensuring a high detection efficiency for neutrons, and being capable of measuring only a neutron with high accuracy while discriminating between a neutron and a γ-ray even in a place where the dose of the γ-ray as a background noise is high, namely, being excellent in n/γ discrimination ability.

It is another object of the invention to provide a neutron scintillator having uniform characteristics and easily available in a large size.

Means for Solving the Problems

The present inventors conducted various studies in an attempt to obtain a neutron scintillator having uniform characteristics with the use of a eutectic composed of lithium fluoride and an inorganic fluorescent material. As a result, they formed the eutectic into particles, and have found that a resin composition having such eutectic particles contained in a resin can be a neutron scintillator which can average the characteristics of a scintillator and is excellent in uniformity. They have also found that the use of the resin composition enables a large-sized scintillator to be obtained easily and a scintillator of a complicated shape to be produced. These findings have led them to accomplish the present invention.

According to the present invention, there is provided a neutron scintillator comprising a resin composition containing a resin and eutectic particles, wherein the resin has an internal transmittance of 10%/cm or more at the emission wavelength of the eutectic particles, and the eutectic particles are composed of lithium fluoride (LiF) and an inorganic fluorescent material.

In the neutron scintillator, it is preferred that 1) the inorganic fluorescent material be an inorganic material containing at least one lanthanoid element selected from the group consisting of cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), and ytterbium (Yb);

2) the ratio ($n_1/n_2$) of the refractive index ($n_1$) of the resin to the refractive index ($n_2$) of the inorganic fluorescent material be in the range of 0.90 to 1.10;

3) the equal specific surface area sphere equivalent diameter of the eutectic particles be in the range of 50 to 1000 μm;

4) filler particles be contained further;

5) the ratio ($n_1/n_3$) of the refractive index ($n_1$) of the resin to the refractive index ($n_3$) of the filler particles be in the range of 0.90 to 1.10; and 6) a neutron insensitive phosphor be contained further.

According to the present invention, there is further provided a neutron detector comprising each of the above neutron scintillators and a photodetector.

In the above neutron detector, it is preferred that 7) the neutron scintillator and the photodetector be optically connected together by a wavelength shifter composed of a wavelength shifting fiber or a wavelength shifting sheet.

Effects of the Invention

According to the present invention, there are provided a neutron scintillator having a high detection efficiency for neutrons, excelling in n/γ discrimination ability, having uniform characteristics, and easily producible in a large size; and a neutron detector using the neutron scintillator.

The neutron detector can accurately measure neutrons even in a place where the dose of γ rays acting as a background noise is high. In applications where a neutron transmission image is produced, in particular, the neutron detector can diminish the distortion of the image due to the nonuniformity of the neutron scintillator. Also, it can be provided as a neutron detector for a large-sized imaging device.

Such a neutron scintillator can be suitably used in security fields such as cargo inspection, academic and research fields such as structure analysis by neutron diffraction, nondestructive inspection fields, or medical fields such as boron neutron capture therapy.

MODE FOR CARRYING OUT THE INVENTION

<Neutron Scintillator>

Figure 1:
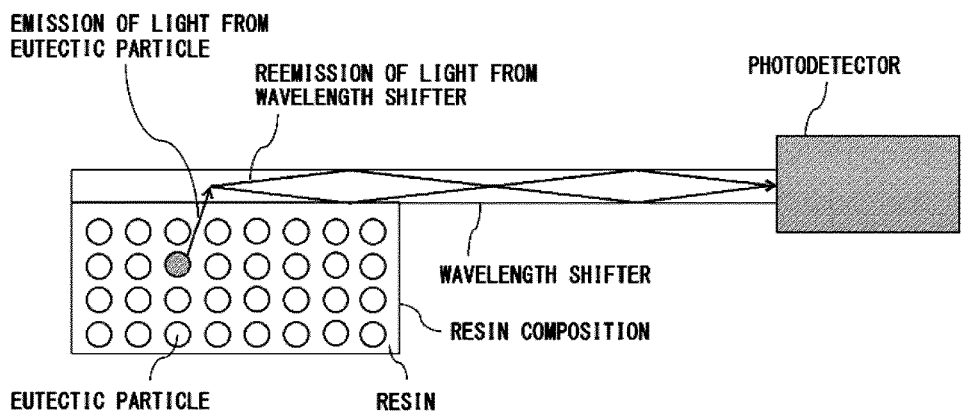
FIG. 1 is a view schematically showing a manner in which a neutron scintillator and a photodetector are optically connected together by a wavelength shifter.

The neutron scintillator of the present invention has eutectic particles of lithium fluoride (LiF) and an inorganic fluorescent material as a first constituent element.

In the eutectic particle, the LiF and the inorganic fluorescent material are phase-separated into independent phases, and together form a texture structure, such as a multilayer structure in which the respective phases are alternately stacked, or a honeycomb structure in which in a matrix comprising one of the phases, a multiplicity of the other cylindrical phases are arranged.

Upon entry of a neutron, the eutectic particle emits scintillation light based on the following process: First, a neutron is incident on the LiF. The neutron is captured by Li-6 isotope in the LiF to cause a capture reaction, thereby generating secondary particles, an α particle, and tritium. Then, such secondary particles migrate in the eutectic, and reach the inorganic fluorescent material to excite the inorganic fluorescent material. Finally, the excited inorganic fluorescent material emits scintillation light.

[Lithium Fluoride]

In the eutectic particle, the LiF, one of its constituents, preferably has a Li-6 isotope ratio of 20 to 99%. By setting the Li-6 isotope ratio at 20% or more, the probability of the capture reaction rises to increase the efficiency of detecting neutrons. In view of costs involved in isotope enrichment, on the other hand, it is preferred to set the Li-6 isotope ratio at 99% or less.

[Inorganic Fluorescent Material]

In the present invention, the inorganic fluorescent material is not particularly limited, if it generates fluorescence upon exposure to a secondary particles produced by the capture reaction. However, it is preferably a fluoride (except for LiF).

If an inorganic fluorescent material other than a fluoride, for example, an inorganic fluorescent material having an oxygen ion, a chlorine ion, or a carbonate ion, as an anion, is used, the anion may react with LiF during the manufacturing process for the eutectic, forming lithium oxide, lithium chloride, or lithium carbonate, respectively. Since these lithium compounds are deliquescent, they are likely to deliquesce in the air and deteriorate the performance of the neutron scintillator.

Fluorides preferred as the inorganic fluorescent material are concretely exemplified by $MgF_2$, $CaF_2$, $SrF_2$, $LaF_3$, $LiBaF_3$, $LiYF_4$, $LiLuF_4$, and their solid solutions.

The inorganic fluorescent material preferably has at least one element, selected from the group consisting of transition elements such as Ti, Cr, Mn, Cu, Ag, Zn, Cd, Sn and lanthanoid elements, incorporated therein as a luminescent center element. By incorporating the luminescent center element, the intensity of scintillation light emitted by the inorganic fluorescent material can be enhanced. Of the above luminescent center elements, at least one lanthanoid element selected from Ce, Pr, Nd, Sm, Eu, Gd, Tb, Dy, Ho, Er, Tm and Yb is particularly preferably incorporated.

These luminescent center elements are different in luminescence characteristics depending on their type. Thus, it is preferred to select the type of the luminescent center element in accordance with the neutron detector to which the luminescent center element is applied. Concretely, a luminescent center element such as Ce, Pr, Nd or Eu exhibits luminescence with a short fluorescence lifetime, and thus can be used preferably for a scintillation counting type neutron detector. By contrast, a luminescent center element such as Tb, Dy or Yb exhibits a very intense luminescence, and thus can be employed preferably for an integral type neutron detector.

Among modes for incorporating the luminescent center element into the inorganic fluorescent material are the mode of adding the luminescent center element to a compound serving as a base material for the inorganic fluorescent material, and the mode of substituting a part of an element of the compound, which serves as the base material for the inorganic fluorescent material, by the luminescent center element.

As a concrete example, a compound comprising a luminescent center element, such as $CeF_3$ or $EuF_3$, may be mixed with a compound, such as $CaF_2$ or $SrF_2$, which serves as the base material for the inorganic fluorescent material, to prepare a starting material. This starting material may be melted and then solidified, for example, whereby the luminescent center element may be added to the compound serving as the base material for the inorganic fluorescent material. An alternative may be as follows: In synthesizing $LiYF_4$, which serves as the base material for the inorganic fluorescent material, from LiF and $YF_3$, the amount of $YF_3$ is subtracted from the stoichiometric ratio. This subtracted amount of $YF_3$ and an equimolar amount of a compound comprising a luminescent center element, such as $TbF_3$, are added to prepare a starting material. The starting material is melted and then solidified, for example, whereby the elements of the compound, which serves as the base material for the inorganic fluorescent material, are partly substituted by the luminescent center element.

The amount of the luminescent center element to be incorporated into the inorganic fluorescent material is not particularly limited. Preferably, an optimum amount is selected depending on the type of the luminescent center element. Generally, the larger the amount of the luminescent center element incorporated, the higher the intensity of scintillation light becomes. If the incorporated amount is excessively large, however, attenuation of scintillation light due to concentration quenching may occur, or the eutectic may become clouded markedly.

The optimal amount of the luminescent center element differs according to the type of the luminescent center element. If the luminescent center element is Ce or Eu, for example, it is preferred to set the amount of the luminescent center element at 0.05 to 5 mol % based on the inorganic fluorescent material. If the luminescent center element is Tb, it is preferred to set the amount of the luminescent center element at 1 to 20 mol % based on the inorganic fluorescent material.

The refractive index of the inorganic fluorescent material is preferably close to the refractive index of LiF at the emission wavelength of the inorganic fluorescent material. Since the refractive index of the inorganic fluorescent material is close to the refractive index of LiF, scattering of light at the interface between the inorganic fluorescent material and the LiF is suppressed. Thus, light emitted by the inorganic fluorescent material can be propagated efficiently to the photodetector.

Concretely, the ratio of the refractive index of the inorganic fluorescent material to the refractive index of the LiF is preferably 0.90 to 1.10, particularly preferably 0.95 to 1.05. At the wavelength of sodium D line, for example, the refractive index of LiF is 1.39, while the refractive indexes of $MgF_2$, $CaF_2$ and $SrF_2$ are 1.39, 1.43 and 1.44, respectively. When $MgF_2$, $CaF_2$ and $SrF_2$ are used as the inorganic fluorescent materials, therefore, the ratios of the refractive indexes of the inorganic fluorescent materials to the refractive index of LiF are 1.00, 1.03 and 1.04, respectively. Thus, these inorganic fluorescent materials composed of fluorides of alkaline earth metals can be used particularly preferably.

These refractive indexes of the LiF and the inorganic fluorescent material are the refractive indexes in the temperature range where the scintillator of the present invention is used. When the scintillator of the present invention is used at a temperature in the vicinity of 100° C., for example, the above refractive index ratio needs to be determined at 100° C.

If, in the present invention, the inorganic fluorescent material has birefringence, its refractive index may be represented by a refractive index to an ordinary ray.

[Eutectic Particles]

In the eutectic particles, LiF is preferably in a fine shape. As mentioned above, a secondary particle produced by the capture reaction between Li-6 in the LiF and a neutron migrates within the eutectic, and reaches the inorganic fluorescent material to excite the inorganic fluorescent material. Here, the secondary particle loses part of its energy even during the migration within the LiF. Thus, if the distance covered by the secondary particle during migration within LiF differs each time a neutron is incident, the energy imparted to the inorganic fluorescent material varies.

According to studies by the present inventors, the formation of LiF into a fine shape can suppress variations in the energy imparted to the inorganic fluorescent material from the secondary particle produced in the nuclear reaction. As a result, variations in the intensity of scintillation light emitted by the inorganic fluorescent material can be suppressed.

The results of the various studies show that the thickness of LiF, if in a layered form, or the diameter of LiF, if in a cylindrical shape, is set preferably at 0.1 to 5 µm, particularly preferably at 0.1 to 3 µm. By setting the thickness of the layered LiF, or the diameter of the cylindrical LiF, at 5 µm or less, particularly preferably 3 µm or less, variations in the intensity of scintillation light decrease. Thus, it is possible to obtain a neutron detector excellent in the performance of easily discriminating between a signal ascribed to a neutron and noise due to a γ-ray, namely, n/γ discrimination ability.

There is no particular restriction on the lower limit of the thickness of the layered LiF or the diameter of the cylindrical LiF. However, setting the thickness or diameter at less than 0.1 µm is technically difficult, and requires that a special measure be taken. A method of forming the LiF in the eutectic particle into a fine shape will be described later.

The texture structure of the eutectic particle can be identified by observing a compositional image in backscattered electron (BSE) mode (or BSE compositional image) with the use of a scanning electron microscope (SEM). That is, in the BSE compositional image, the LiF and the inorganic fluorescent material exhibit a clear contrast based on a difference between their atomic numbers. Thus, an image reflecting the texture structure can be obtained easily.

Based on such a BSE compositional image, the thickness of the layered LiF or the diameter of the cylindrical LiF can be measured. In this measurement, the length measuring function of the SEM is used, and the measurement is made upon calibration using a standard grid with a known spacing.

The phase constituting the eutectic particle can be identified by powder X-ray diffractometry. That is, a powder of the eutectic particle is subjected to powder X-ray diffraction measurement, and the resulting diffraction pattern is analyzed to identify the sample as a eutectic composed of LiF and a predetermined inorganic fluorescent material.

The shape of the eutectic particle is not particularly limited, and plate-shaped, prismatic, cylindrical, spherical or indefinite-form eutectic particles can be used arbitrarily.

The size of the eutectic particle is not particularly limited, but the diameter of the eutectic particle equivalent to the diameter of a sphere with an equal specific surface area (will hereinafter referred to as equal specific surface area sphere equivalent diameter, or simply, sphere equivalent diameter)

is preferably 50 µm or more, particularly preferably 100 µm or more. If the equal specific surface area sphere equivalent diameter of the eutectic particle is less than 50 µm, there may be an event in which the secondary particles generated by the neutron capture reaction between the Li-6 and the neutron departs from the eutectic particle before imparting all of its energy to the eutectic particle, because the range distance of the secondary particle is several tens of micrometers. If such an event occurs, the energy imparted to the eutectic particle by the incidence of the neutron declines, thus lowering the intensity of light emission by the eutectic particle.

There is no particular restriction on the upper limit of the size of the eutectic particle. However, in order to obtain the sufficient effect of averaging changes in the fineness of the texture structure of the eutectic and the orientation of the texture structure, the equal specific surface area sphere equivalent diameter of the eutectic particle is preferably 1000 µm or less, particularly preferably 500 µm or less.

[Method for Producing Eutectic Particles]

A method for producing eutectic particles for use in the present invention is not particularly limited. A manufacturing method comprising a step of heating a starting material mixture (or starting mixture) composed of powders of LiF and an inorganic fluorescent material until the mixture is melted, to form a melt; a step of cooling the melt to solidify it, thereby obtaining a eutectic ingot; and a step of grinding and classifying the eutectic ingot to obtain eutectic particles can be adopted preferably.

The mixing ratio between the LiF and the inorganic fluorescent material in the starting mixture is preferably in conformity with the composition ratio of each component in the eutectic (eutectic composition). If one of the components is in excess with respect to the eutectic composition, the excess component may precipitate independently, adversely affecting the uniformity of the resulting scintillator.

The eutectic composition differs according to the type of the inorganic fluorescent material used, but can be found by a technique such as thermal analysis. For example, the mixing ratio of the eutectic composition when $MgF_2$, $CaF_2$, $SrF_2$, $LaF_3$, $LiBaF_3$ or $LiYF_4$ is used as the inorganic fluorescent material is 80/20, 81/19, 83/17, 65/35 or 61/39 (mol/mol), respectively, as the LiF/inorganic fluorescent material ratio.

If a complex compound such as $LiBaF_3$ or $LiYF_4$ is used, a powder of this complex compound may be used as a starting material, or a mixture of powders of the respective components of the complex compound (e.g., LiF and $BaF_2$, LiF and $YF_3$, or the like) blended in agreement with the stoichiometric composition of the complex compound may be used as a starting material. If the aforementioned luminescent center element is incorporated into the inorganic fluorescent material, a fluoride or the like of the luminescent center element in an intended amount may be added into the starting mixture.

In the step of obtaining the eutectic ingot, when the melt solidifies, the LiF and the inorganic fluorescent material in the melt are phase-separated into independent phases to form a texture structure.

The form of the texture structure differs depending on the type of the inorganic fluorescent material. It is, for example, a multilayer structure having layered LiF and layered $CaF_2$ or $SrF_2$ stacked alternately when the inorganic fluorescent material is $CaF_2$ or $SrF_2$; or a honeycomb structure having many LiF cylinders arranged in a matrix composed of $LiYF_4$ or $LiLuF_4$ when the inorganic fluorescent material is $LiYF_4$ or $LiLuF_4$.

By increasing the cooling rate for cooling of the melt, LiF in the eutectic can be formed into a fine shape. In order to set the thickness of the layered LiF or the diameter of the cylindrical LiF at 5 µm or less and obtain a scintillator having satisfactory characteristics, the cooling rate is set at 5° C./hr or higher preferably, 20° C./hr or higher particularly preferably, and 100° C./hr or higher most preferably.

In cooling the melt, it is recommendable to cool the melt at a high cooling rate until a temperature about 200° C. lower than the melting point is reached, and to cool the melt at a low cooling rate when the temperature is equal to or lower than this temperature. The upper limit of the cooling rate is not particularly limited, but is preferably 3000° C./hr or lower for the purpose of avoiding damage to the manufacturing apparatus due to quenching.

So far, there has been the problem that when the above eutectic ingot is processed and used as a neutron scintillator of a predetermined shape, the characteristics of the neutron scintillator vary depending on the site of the eutectic.

The present inventors postulated that the causes of this problem would be as follows: In the step of obtaining the eutectic ingot, the cooling rate and the direction of cooling proceeding are different according to the site of the eutectic. Thus, the microstructures of the textures are variable, and the orientations of the texture structures are different. Hence, the propagation efficiency of light emitted from the inorganic fluorescent material differs.

The present invention has been accomplished to solve such a problem, and is characterized most greatly by using a eutectic in the form of particles, and using a resin composition containing such eutectic particles as a neutron scintillator. In this aspect, it is speculated that changes in the fineness of the texture structures of the eutectic and the orientations of the texture structures are averaged, so that a neutron scintillator having uniform characteristics can be obtained.

A method for producing eutectic particles is not particularly limited. Examples of the method are a method of grinding and classifying a eutectic ingot to obtain eutectic particles of a desired shape; a method of cooling, while spraying or dripping, a melt having a starting mixture melted therein to obtain eutectic particles of a desired shape; and a method of subjecting solutions of LiF and an inorganic fluorescent material, as starting materials, to a particle formation reaction to directly obtain eutectic particles of a desired shape.

Of the above production methods, the method of grinding and classifying a eutectic ingot is preferred, because it has a high production efficiency and provides desired eutectic particles inexpensively.

A method for grinding the eutectic ingot is not particularly limited, and a publicly known grinder, such as a hammer mill, a roller mill, a rotary mill, a ball mill, or a bead mill, can be used without limitation. Of them, a hammer mill and a roller mill are used preferably in order to suppress the occurrence of a fine powder and efficiently obtain eutectic particles having an equal specific surface area sphere equivalent diameter of 50 µm or more or 100 µm or more.

As a method for classifying the eutectic particles resulting after grinding of the eutectic ingot, a publicly known method, such as dry sieving, wet sieving or pneumatic classification can be applied without restriction.

When desired eutectic particles are classified by sieving, particles which pass through a sieve located above and having an opening size of 500 to 1000 µm and which remain on a sieve located below and having an opening size of 50 to 100 μm are collected, whereby eutectic particles of a preferred size can be obtained.

[Resin]

In the neutron scintillator of the present invention, a resin is needed as a second constituent element. The neutron scintillator is characterized in that the above eutectic particles are incorporated in the resin to form a resin composition.

As the resin, it is preferred to use a resin whose internal transmittance at the emission wavelength of the inorganic fluorescent material (hereinafter will be referred to simply as internal transmittance) is high, in order to propagate luminescence from the inorganic fluorescent material to the photodetector with high efficiency.

When the thickness of the neutron scintillator is small, the influence of the internal transmittance is minimal. Thus, the internal transmittance can be changed according to the thickness of the neutron scintillator, and an optimal resin may be selected, as appropriate, and used. In the case of a scintillator as thin as 0.2 to 1 mm, for example, a resin having an internal transmittance of 10%/cm or more suffices. In the case of a scintillator having a thickness exceeding 1 mm, however, a resin having an internal transmittance of 50%/cm or more is preferred. For a thick scintillator more than 3 mm in thickness, a resin having an internal transmittance of 80%/cm or more is preferred, and a resin having an internal transmittance of 90%/cm or more is particularly preferred.

The resin is concretely exemplified by a methyl silicone resin, a methyl phenyl silicone resin, a phenyl silicone resin, a fluorinated silicone resin, polymethyl methacrylate, polyvinyl chloride, polyvinylidene chloride, polycarbonate, polystyrene, polyvinyltoluene, and polyvinyl alcohol. Several kinds of these resins may be mixed and used, with a view to adjusting the refractive index.

In the present invention, the term "internal transmittance" refers to a transmittance from which a surface reflection loss occurring on the incoming side and outgoing side surfaces of the resin has been removed when light is transmitted through the resin. The internal transmittance is expressed as a value per centimeter of an optical path length.

The internal transmittance (τ10) per cm of the optical path length can be obtained by measuring the transmittances including surface reflection losses of a pair of resins with different thicknesses, and substituting the transmittances into the following formula (1):

$$\log(\tau 10) = \{\log(T2) - \log(T1)\}/(d2-d1) \quad (1)$$

(where d1 and d2 represent the thicknesses (cm) of the pair of resins, with d2>d1; and T1 and T2 represent transmittances including surface reflection losses of the resins having the thicknesses d1 and d2, respectively.)

The refractive index of the resin also affects the detection efficiency for neutrons. Thus, it is preferred to use a resin whose refractive index at the emission wavelength of the inorganic fluorescent material (will hereinafter be referred to simply as refractive index) is close to the refractive index of the inorganic fluorescent material.

Concretely, the ratio ($n_1/n_2$) of the refractive index of the resin ($n_1$) to the refractive index of the inorganic fluorescent material ($n_2$) is preferably 0.90 to 1.10, particularly preferably 0.95 to 1.05, and most preferably 0.98 to 1.02. By setting the ratio ($n_1/n_2$) in such a range, the scattering of light at the interface between the inorganic fluorescent material and the resin can be suppressed, and light emission from the inorganic fluorescent material can be efficiently propagated to the photodetector.

These refractive indexes of the inorganic fluorescent material and the resin are refractive indexes in the temperature range where the scintillator of the present invention is used. When the scintillator of the present invention is used at around 100° C., for example, the above-mentioned refractive index ratio needs to be determined at 100° C.

The refractive indexes of the inorganic fluorescent material and the resin at the emission wavelength of the inorganic fluorescent material can be measured using a refractometer. Generally, d-line (587.6 nm) and r-line (706.5 nm) of a He lamp, F-line (486.1 nm) and C-line (656.3 nm) of a $H_2$ lamp, and i-line (365.0 nm), h-line (404.7 nm), g-line (435.8 nm) and e-line (546.1 nm) of a Hg lamp can be used as light sources for the refractometer.

A light source on a shorter wavelength side and a light source on a longer wavelength side than the emission wavelength of the inorganic fluorescent material are suitably selected from these light sources, and used to measure refractive indexes at the wavelengths of the selected light sources. The wavelengths of the respective light sources and the refractive indexes measured at these wavelengths are substituted into the following Sellmeier formula (2) to obtain constants A and B. Then, the emission wavelength of the inorganic fluorescent material is substituted into this formula, whereby a desired refractive index can be obtained. If the emission wavelength of the inorganic fluorescent material is the same as the wavelength of any one of the above light sources, the refractive index may be obtained using this light source.

$$n^2 - 1 = A\lambda^2/(\lambda^2 - B) \quad (2)$$

(where n represents a refractive index at a wavelength λ, and A and B are constants).

In measuring such a refractive index, it is recommendable to use a bulk body of the inorganic fluorescent material and a bulk body of the resin which have shapes suitable for the measurement.

In the present invention, the content of the eutectic particles in the resin composition is not particularly limited, but the volume fraction of the eutectic particles in the resin composition is preferably 10% to 70%, particularly preferably 20% to 60%. By setting the volume fraction of the eutectic particles in the resin composition to be in such a range, the neutron detection efficiency per unit volume of the resin composition can be increased. In view of the ease of production of the resin composition, on the other hand, the volume fraction of the eutectic particles in the resin composition is preferably set at 70% or less, particularly preferably 60% or less.

In the present invention, the resin serves as a dispersant and a binder. Thus, the content of the resin in the resin composition may be 1% or more, preferably 5% or more, as a volume fraction. Depending on the content and properties of the resin, a slurried, pasty or solid scintillator can be produced.

To form a slurried or pasty scintillator, it suffices to mix a liquid or viscous resin and eutectic particles. A solid scintillator is produced by mixing the eutectic particles and a liquid or viscous resin precursor, and then curing the resin precursor.

The method for producing the resin composition is not particularly limited, but concrete production will be illustrated below.

When the resin composition is used as a slurried or pasty scintillator, eutectic particles and a liquid or viscous resin are mixed first. In such a mixing operation, a publicly known mixer such as a propeller mixer, a planetary mixer, or a butterfly mixer can be used without restriction.

Then, air bubbles formed in the resin composition during the mixing operation are defoamed. In such a defoaming operation, a defoaming machine such as a vacuum defoaming machine or a centrifugal defoaming machine can be used without restriction. By performing the defoaming operation, scattering of light by air bubbles can be suppressed, and light emission from the inorganic fluorescent material can be propagated efficiently to the photodetector.

In the mixing operation and the defoaming operation, an organic solvent such as toluene, hexane, ethanol or acetone may be added in an amount of 20% by mass or less, preferably 10% by mass or less, based on the total mass of the resin composition, for the purpose of decreasing the viscosity of the resin composition, thereby carrying out mixing and defoaming efficiently.

When the resin composition is used as a solid scintillator, a mixing operation and a defoaming operation are performed in the same manner as above using a liquid or viscous resin precursor. Then, the resulting mixture of the eutectic particles and the resin precursor is poured into a mold of a desired shape, and the resin precursor is cured. A method for curing is not particularly limited, but a method of polymerizing the resin precursor by heating, ultraviolet irradiation, or addition of a catalyst is preferred.

A neutron scintillator composed of the resin composition according to the present invention can be used as a slurry or paste capable of taking any form. For use as a solid as well, the scintillator can be molded using a mold of a desired shape, and can be easily formed into any shape. According to the present invention, therefore, it is possible to provide a neutron scintillator of a varying shape or size, such as a fiber-shaped, hollow tube-shaped, or large area one, depending on the intended use.

[Filler Particles]

If the eutectic particles and the resin differ in specific gravity, the eutectic particles may precipitate or float to be separated in the liquid resin or the resin precursor before curing. As a result, the characteristics of the resulting neutron scintillator may become nonuniform. To suppress such separation of the eutectic particles and obtain a neutron scintillator having uniform characteristics, it is preferred to incorporate filler particles further into the resin composition.

Since the filler particles are filled in the gaps between the eutectic particles, the separation of the eutectic particles can be suppressed. In order to exhibit the filling effect, it is preferred to blend 20 parts by volume or more of the filler based on 100 parts by volume of the eutectic particles, as a volume ratio. The upper limit of the volume ratio is advisably set at 500 parts by volume or less, preferably 200 parts by volume or less, particularly preferably 120 parts by volume or less, in order to prevent the viscosity of the liquid resin composition or the resin precursor before curing from becoming excessively high.

It is particularly preferred for the specific gravity of the filler particles to be comparable to that of the eutectic particles. By setting the specific gravity of the filler particles to be comparable to that of the eutectic particles, the speeds of precipitation or floating, in the resin, of the filler particles and the eutectic particles are identical, and the filler particles are elaborately filled in the gaps between the eutectic particles. As a result, the eutectic particles are uniformly dispersed in the resin composition, so that the uniformity of the neutron scintillator is further improved.

Further, the filler particle in use preferably has a refractive index ($n_3$), at the emission wavelength of the eutectic particle, close to the refractive index ($n_1$) of the resin. Concretely, the ratio ($n_1/n_3$) of the refractive index of the resin to the refractive index of the filler particle is preferably 0.90 to 1.10, particularly preferably 0.95 to 1.05, and most preferably 0.98 to 1.02.

By setting this ratio ($n_1/n_3$) in such a range, the scattering of light at the interface between the filler particle and the resin can be suppressed, and light emission from the inorganic fluorescent material can be propagated efficiently to the photodetector.

These refractive indexes of the filler particle and the resin are refractive indexes in the temperature range where the scintillator of the present invention is used. When the scintillator of the present invention is used at around 100° C., for example, the above-mentioned refractive index ratio needs to be determined at 100° C.

The filler particle preferably has a shape comparable to or smaller than that of the eutectic particle, in order to be filled in the gap between the eutectic particles.

Concretely, the filler particles in preferred use are those having a particle size adjusted in the same manner as for the eutectic particles, or those having a particle size adjusted so as to become smaller particles than the eutectic particles, for example, by classification using a sieve having a smaller opening size than for the eutectic particles.

Concrete examples of the filler particles are particles of inorganic materials, such as silica, titanium oxide, barium sulfate, calcium fluoride, magnesium fluoride, LiF, magnesium carbonate, strontium fluoride, mica, and various glasses; and particles of organic materials, such as silicone resin, fluororesin, polymethyl methacrylate, polyvinyl chloride, polyvinylidene chloride, polycarbonate, polystyrene, polyvinyltoluene, polyvinyl alcohol, polyethylene, and styrene butadiene.

If the organic material particles are the same as the resin incorporated in the resin composition, the organic material particles and the resin after molding are integrated and inexistent as the filler particles.

[Neutron Insensitive Phosphor]

In the present invention, it is preferred to further incorporate a phosphor, which does not contain an isotope causing a neutron capture reaction, such as Li-6, and which does not react to neutrons, (may hereinafter be referred to as a neutron insensitive phosphor), in addition to the eutectic particles and the resin, thereby forming a neutron scintillator.

The effect of incorporating the neutron insensitive phosphor will be described. When a γ-ray is incident on the neutron scintillator, there may be a case in which a high speed electron occurs in the neutron scintillator, and the high speed electron imparts energy to the eutectic particle, whereupon the inorganic fluorescent material in the eutectic particle emits luminescence. If the intensity of the luminescence ascribed to the γ-ray is comparable to the intensity of luminescence upon the incidence of a neutron, the incidence of γ-ray is mistakenly detected as the incidence of a neutron, with the result that an error occurs in the counting of neutrons.

The range distance of the high speed electron generated by the γ-ray is several millimeters, a length sufficiently larger than the size of the eutectic particle. When the neutron insensitive phosphor is coexistent, therefore, the high speed electron departs from the eutectic, and reaches the neutron insensitive phosphor to impart energy to it, so that the neutron insensitive phosphor also emits fluorescence. That is, upon the incidence of a gamma ray, both the eutectic particle and the neutron insensitive phosphor are provided with energy to emit fluorescence. When a neutron is incident, on the other hand, a secondary particles produced in the eutectic particle do not depart from the eutectic particle, and only the eutectic particle emits fluorescence.

Consequently, a neutron and a γ-ray can be discriminated from each other by utilizing the difference between the fluorescent characteristics of the eutectic particle and the neutron insensitive phosphor. In detail, a mechanism capable of distinguishing differences in fluorescent characteristics such as a fluorescence lifetime and an emission wavelength is provided in a neutron detector. When both fluorescence ascribed to the eutectic particle and fluorescence due to the neutron insensitive phosphor are detected, this can be treated as an event representing the incidence of a γ-ray. When only fluorescence resulting from the eutectic particle is detected, this can be treated as an event representing the incidence of a neutron. By such treatment, a neutron detector having by far better n/γ discrimination ability can be acquired.

The mechanism capable of distinguishing between differences in fluorescent characteristics is concretely exemplified by a waveform analysis mechanism capable of identifying a difference between the fluorescence lifetimes of the eutectic particle and the neutron insensitive phosphor, and a wavelength analysis mechanism capable of distinguishing between the emission wavelengths of the eutectic particle and the neutron insensitive phosphor.

The waveform analysis mechanism will be described concretely below. The waveform analysis mechanism is composed of a preamplifier, a main amplifier, a waveform analyzer, and a time-to-amplitude converter.

In a neutron detector comprising the neutron scintillator of the present invention in combination with a photodetector, a signal outputted from the photodetector is inputted to the main amplifier through the preamplifier to be amplified and shaped. The intensity of a signal outputted from the main amplifier after amplification and shaping in the main amplifier increases with time. The time required for this increase (rise time) reflects the fluorescence lifetime of the eutectic particle or the neutron insensitive phosphor. The shorter the fluorescence lifetime, the shorter the rise time becomes.

To analyze the rise time, the signal amplified and shaped by the main amplifier is inputted to the waveform analyzer. The waveform analyzer performs the time integration of the signal inputted from the main amplifier, and outputs a logic signal when the intensity of the time-integrated signal exceeds a predetermined threshold value. The waveform analyzer is provided with threshold values in two stages, and a first logic signal and a second logic signal are outputted at a certain time interval.

Then, the two logic signals outputted from the waveform analyzer are inputted to the time-to-amplitude converter (TAC), which converts the time difference between the two logic signals outputted from the waveform analyzer into a pulse amplitude and outputs it. The pulse amplitude reflects the time interval between the first logic signal and the second logic signal outputted from the waveform analyzer, namely, the rise time.

As will be understood from the foregoing descriptions, the smaller the pulse amplitude outputted from the time-to-amplitude converter, the shorter the rise time becomes, thus identifying the fluorescence lifetime of the eutectic particle or the neutron insensitive phosphor to be short.

Examples of the neutron insensitive phosphor include organic fluorophores such as 2,5-diphenyloxazole, 1,4-bis (5-phenyl-2-oxazolyl)benzene, 1,4-bis(2-methylstyryl)benzene, anthracene, stilbene, naphthalene, and derivatives thereof.

Since these organic fluorophores generally have a short fluorescence lifetime as compared with the eutectic particle, this difference in fluorescence lifetime can be utilized to enhance the n/γ discrimination ability.

The content of the neutron insensitive phosphor in the neutron scintillator of the present invention can be suitably set within a range in which the aforementioned effect can be exhibited. In order for the neutron insensitive phosphor to be excited efficiently by energy from the high speed electron, thereby obtaining high intensity emission, its content is preferably 0.005 mass % or more, particularly preferably 0.01 mass % or more, with respect to 100 parts by mass of the resin. The upper limit of the content of the neutron insensitive phosphor in the neutron scintillator of the present invention is not particularly limited. However, from the viewpoints of preventing the reduction of emission intensity due to concentration quenching and securing the accuracy of n/γ discrimination upon reliable observation of short-life fluorescence, the content of the neutron insensitive phosphor is preferably 10 mass % or less, more preferably 5 mass % or less, and particularly preferably 2 mass % or less, with respect to 100 parts by mass of the resin.

<Neutron Detector>

The neutron detector of the present invention comprises the above-described neutron scintillator in combination with a photodetector. That is, light emitted from the neutron scintillator upon the incidence of a neutron is converted into an electric signal by the photodetector. In this manner, the incidence of a neutron is measured as an electric signal, and can be used for neutron counting or the like.

The photodetector is not particularly limited, and publicly known photodetectors such as a photomultiplier tube, a photodiode, an Avalanche photodiode, and a Geiger mode Avalanche photodiode can be used without restriction.

The neutron scintillator has a light emission surface facing to the photodetector, and the light emission surface is preferably a flat surface. Since such a light emission surface is provided, light produced by the neutron scintillator can be rendered incident on the photodetector with good efficiency.

In a preferred embodiment, a light reflection film comprising aluminum or polytetrafluoroethylene, for example, is applied to a surface of the neutron scintillator not facing to the photodetector, whereby dissipation of light generated by the neutron scintillator can be prevented.

A method for producing the neutron detector of the present invention is not particularly limited. For example, the light emission surface of the neutron scintillator is optically bonded to a light detection surface of the photodetector with the use of optical grease or optical cement, and a power source and a signal readout circuit are connected to the photodetector, whereby a neutron detector can be produced. The signal readout circuit is generally composed of a preamplifier, a shaping amplifier, and a multichannel pulse height analyzer.

Moreover, a multiplicity of the neutron scintillators each provided with the light reflection film are arrayed, and a position sensitive type photodetector, such as a multianode photomultiplier tube, a photodiode array, a Geiger mode Avalanche photodiode array, or a CCD detector, is used as the photodetector, so that position resolution can be imparted to the neutron detector.

<Wavelength Shifter-Equipped Neutron Detector>

An embodiment in which a neutron scintillator and a photodetector are optically connected together by a wavelength shifting fiber or a wavelength shifting sheet (hereinafter referred to as a wavelength shifter) can be adopted preferably in the present invention.

The wavelength shifter acts as a light guide for guiding light emission from the eutectic particle in the resin composition to the photodetector.

The action mechanism of the wavelength shifter will be described using FIG. 1. When light emitted from the eutectic particle reaches the wavelength shifter, the wavelength shifter absorbs light emitted from the eutectic particle, and reemits light at a wavelength different from the wavelength of the original light. The light emission from the wavelength shifter occurs isotropically, and light emitted at a certain angle with respect to the outer surface of the wavelength shifter propagates, while being totally reflected, within the wavelength shifter, and arrives at the end of the wavelength shifter. By installing a photodetector at the end of the wavelength shifter, light emitted from the eutectic particle can be collected via the wavelength shifter.

Such an embodiment can be employed particularly preferably for collection of light emitted from a large area scintillator into a small-sized photodetector. Moreover, a multiplicity of the wavelength shifters may be arranged, and a mechanism capable of identifying via which of the wavelength shifters scintillation light has reached may be provided. By so doing, it becomes possible to construct a position sensitive type neutron detector which can specify the position of incidence of a neutron.

The wavelength shifting fiber or wavelength shifting sheet is a plastic or glass base material shaped in the form of a fiber or sheet after a fluorophore is incorporated therein. By the action of the fluorophore, this wavelength shifting fiber or sheet absorbs light of a certain wavelength, and reemits light at a wavelength different from the original wavelength.

The material for the wavelength shifting fiber or wavelength shifting sheet is not particularly limited. Generally, there are commercially available products comprising organic fluorophores having various absorption wavelengths, such as 2,5-diphenyloxazole, 1,4-bis(5-phenyl-2-oxazolyl)benzene, 1,4-bis(2-methylstyryl)benzene, anthracene, stilbene, naphthalene, and derivatives thereof, incorporated in plastic base materials such as polystyrene, polymethyl methacrylate, and polyvinyltoluene.

In the present invention, it is preferred to select the wavelength shifting fiber or wavelength shifting sheet having an absorption wavelength conformed to the emission wavelength of the eutectic particle and use it.

The shape of the wavelength shifting fiber or wavelength shifting sheet is not particularly limited. The preferred wavelength shifting fiber for use has a circular cross section with a diameter of 0.1 to 5 mm, or has a quadrilateral cross section with each side measuring 0.1 to 5 mm. As the wavelength shifting sheet, one having a thickness of 0.1 to 5 mm can be used preferably.

To increase the efficiency of propagation of light within the wavelength shifter, it is preferred to use a product which has the above base material incorporating the organic fluorophore, as a core material, and has a cladding material provided on the surface of the core material and having a lower refractive index than the core material.

Generally, the wavelength shifter is disposed in contact with the resin composition which is the scintillator (see FIG. 1). In a preferred embodiment, however, the wavelength shifter is embedded in the resin composition.

By adopting such an embodiment, a loss of light emission from the resin composition due to emission quenching without arrival of light at the wavelength shifter can be markedly reduced, and the efficiency of light collection is increased. In detail, when the wavelength shifter is disposed on the outer periphery of the resin composition, light generated in the resin composition needs to be once emitted out from the resin composition and then be incident on the wavelength shifter via an intermediate phase. When the wavelength shifter is embedded in the resin composition, by contrast, light emitted from the resin composition is incident on the wavelength shifter not through an intermediate phase, so that the loss can be decreased remarkably.

The position where the wavelength shifter is embedded in the resin composition is not particularly limited. Preferably, the wavelength shifter is embedded at a position where the light collection efficiency becomes satisfactory depending on the shape of the resin composition, such as the center or peripheral edge of the resin composition.

When the wavelength shifter is used, the ratio of the refractive index of the wavelength shifter to the refractive index of the resin in the resin composition, at the emission wavelength of the eutectic particle, is preferably 0.95 or higher. Light generated in the eutectic particle is incident on the wavelength shifter via the resin and the light to be incident on the wavelength shifter at an incident angle exceeding a certain critical angle is totally reflected at the interface between the resin and the wavelength shifter, and cannot enter the wavelength shifter.

By setting the refractive index ratio at 0.95 or more, the critical angle can be rendered about 70 degrees or more, whereby the efficiency of incidence from the resin composition onto the wavelength shifter can be increased. Setting the refractive index ratio at 1 or more is particularly preferred, because total reflection does not occur at the interface between the resin and the wavelength shifter. Setting the refractive index ratio at 1.05 or more is most preferred, because this value increases the efficiency of propagation of light, which has been reemitted in the wavelength shifter, within the wavelength shifter while undergoing total reflection at the interface between the wavelength shifter and the resin composition.

Setting such a refractive index ratio also exhibits the intended effect, even when the wavelength shifter is disposed on the outer periphery of the resin composition. That is, if the aforementioned intermediate phase having a refractive index intermediate between those of the resin composition and the wavelength shifter is used, there arise increases in the efficiency of emission from the resin composition to the intermediate phase and the efficiency of incidence from the intermediate phase onto the wavelength shifter.

The refractive index of the resin in the resin composition and the refractive index of the wavelength shifter are refractive indexes in the temperature range where the neutron detector is used. When the neutron detector is used at about 100° C., for example, both the scintillator and the wavelength shifter are exposed to the same temperature. Thus, the above refractive index ratio needs to be determined at 100° C.

The use of the resin, which is incorporated in the resin composition, as the intermediate layer is most preferred for the reasons mentioned below. Total reflection does not occur at the interface between the resin composition and the intermediate layer, and the same effect as that when the wavelength shifter is embedded in the resin composition is obtained.

As described above, the wavelength shifter is generally composed of polystyrene, polymethyl methacrylate, and polyvinyltoluene. Their refractive indexes in sodium D-line (nD) are about 1.5 to 1.6. In order to fulfill the aforementioned requirement for the refractive index ratio, therefore, it is preferred to use a low refractive index resin, which has a lower refractive index than their refractive indexes, as the resin in the resin composition.

As the low refractive index resin, a methyl silicone resin, a methyl phenyl silicone resin, a phenyl silicone resin, a fluorinated silicone resin, and a fluororesin can be used preferably, and those having nD of about 1.3 to 1.5 are commercially available.

As stated earlier, the refractive index of the inorganic fluorescent material is preferably as low as the refractive index of the low refractive index resin. Thus, $MgF_2$, $CaF_2$ and $SrF_2$ are preferred as the inorganic fluorescent materials. Their nD's are 1.39, 1.43 and 1.44, respectively, and can fulfill the aforementioned requirement for the refractive index ratio.

For the sake of convenience, the refractive index in the sodium D line is taken as an example for illustration. However, the same holds true for the refractive index at the emission wavelength of the inorganic fluorescent material.

By embedding the wavelength shifter in the resin composition, the amount of the wavelength shifter used can be cut down. That is, when the wavelength shifter is disposed on the outer periphery of the resin composition, the efficient incidence, on the wavelength shifter, of light emitted from the resin composition requires that the light emission surface of the resin composition be covered, without clearance, with a large amount of the wavelength shifter.

When the wavelength shifter is included in the resin composition, on the other hand, it suffices to confine light in the interior of the resin composition by a publicly known simple technique, such as covering the outer periphery of the resin composition with a reflecting material. By so doing, light travelling in every direction within the resin composition reaches the wavelength shifter eventually. Thus, light emitted from the resin composition can be rendered incident on the wavelength shifter with high efficiency.

As described above, the amount of the wavelength shifter used can be cut down by embedding the wavelength shifter. If its amount used is too small, however, a loss in the quantity of light is liable to increase. Thus, its appropriate amount of use is preferred.

According to studies by the present inventors, the appropriate amount of use can be defined by the ratio of the cross-sectional area of the wavelength shifter to the cross-sectional area of the resin composition either in a cross section perpendicular to the body axis (longitudinal axis) of the wavelength shifting fiber as the wavelength shifter, or in a cross section perpendicular to the sheet surface of the wavelength shifting sheet as the wavelength shifter.

In order to render light, which has been emitted from the resin composition, incident on the wavelength shifter with good efficiency, the ratio of the cross-sectional area is set at 0.005 or more preferably, and 0.05 or more particularly preferably. To cut down the amount of the wavelength shifter used, the ratio of the cross-sectional area is preferably set at 5 or lower, and particularly preferably set at 0.5 or lower.

If there are a plurality of the wavelength shifters, it is appropriate to calculate the sum of the cross-sectional areas (total cross-sectional area) of the plurality of wavelength shifters, and set the ratio of the total cross-sectional area of the wavelength shifters to the cross-sectional area of the resin composition to be in the range described above. According to findings by the present inventors, however, the resin composition is partitioned with the reflecting materials so that the aforementioned ratio of the cross-sectional area is fulfilled for the individual wavelength shifter, whereby light is confined in as narrow a region as possible. By so doing, light can be made incident on the wavelength shifter with high efficiency.

EXAMPLES

The following examples are provided for further illustrating the present invention, but are in no way to be taken as limiting. Not all the combinations of the features described in the Examples are essential to the means for solution in the present invention.

Example 1

<Production of Eutectic Particles>

In the present Example, Eu-containing $CaF_2$ was used as an inorganic fluorescent material, and eutectic particles of LiF and the inorganic fluorescent material were produced. The emission wavelength of the inorganic fluorescent material was 430 nm.

As starting materials, 150 g (6.0 mol) of LiF, 120 g (1.5 mol) of $CaF_2$, and 1.6 g (0.008 mol) of $EuF_3$ were mixed to prepare a starting mixture. Each of the materials used was a powder having a purity of 99.99% or higher. The LiF used had a Li-6 isotope ratio of 95%. In the starting mixture, the mixing ratio between LiF and $CaF_2$ was $LiF/CaF_2=80/20$ (mol/mol), which was the mixing ratio of a eutectic composition. The melting point of the starting mixture having a eutectic composition was 770° C. The amount of Eu, as a luminescent center element, incorporated into $CaF_2$ was 0.5 mol % based on $CaF_2$.

Then, the starting mixture was charged into a carbon crucible with the internal dimensions 100 mm×100 mm×100 mm, and the crucible was mounted in a chamber equipped with an electrical resistance heater, a heat insulating material, and a vacuum evacuation device. Using the vacuum evacuation device, the interior of the chamber was vacuum-evacuated to $2.0 \times 10^{-4}$ Pa or lower. Then, a high purity argon gas mixed with 5 vol % of tetrafluoromethane was introduced into the chamber to perform gas exchange operation. The pressure inside the chamber after the gas exchange operation was set at atmospheric pressure.

After the gas exchange operation, the starting mixture was heated by the heater to be melted. The output of the heater was adjusted so that the temperature of the crucible would be 830° C.

Then, the output of the heater was lowered to cool the melt of the starting mixture melted. The cooling rate was set at 300° C./hr until the temperature of the crucible reached 500° C., and at 100° C./hr when the temperature of the crucible was lower than 500° C. By performing such a procedure, all the melt was solidified to obtain a eutectic ingot.

The eutectic ingot was coarsely ground into an indefinite shape about 2 cm square by means of a hammer, and then ground using a hammer mill. The resulting ground matter was classified by dry classification to collect particles passing through a 300 μm upper sieve, but remaining on a 150 μm lower sieve, thereby obtaining indefinitely shaped eutectic particles.

The resulting eutectic particles were observed for a BSE compositional image with the use of a scanning electron microscope (SEM). The eutectic particles had a multilayer structure having layered LiF and layered $CaF_2$ stacked alternately, and the thickness of the layered LiF was about 1 μm.

The resulting eutectic particles were ground, and the resulting powder was subjected to powder X-ray diffraction measurement to identify crystal phases. Diffraction peaks ascribed to LiF and $CaF_2$ were confirmed, finding that the eutectic was one composed of LiF and $CaF_2$.

<Preparation of Neutron Scintillator>

In the present Example, a methyl phenyl silicone resin having a refractive index of 1.45 at 430 nm, the emission wavelength of the inorganic fluorescent material, was used as a resin. The refractive index of the inorganic fluorescent material at 430 nm was 1.44, and the ratio of the refractive index of the resin to the refractive index of the inorganic fluorescent material was 1.01. This refractive index is a value measured with a refractometer, and a value measured at room temperature, the operating temperature of the neutron scintillator in the present Example, as described earlier.

The resin is composed of two liquids, a liquid A and a liquid B. The two liquids in equal amounts are mixed to prepare a resin precursor, and then the resin precursor can be cured by heating. The internal transmittance of the resin was 95%/cm at 430 nm, the emission wavelength of the inorganic fluorescent material.

The aforementioned eutectic particles (5.7 g; 2.0 mL) were added to 3.0 mL of the resin precursor of the methyl phenyl silicone resin, the mixture of equal amounts of the liquid A and the liquid B. These materials were thoroughly mixed using a stirring rod, and then air bubbles occurring in the mixture during the mixing operation were defoamed using a vacuum defoaming machine to obtain a precursor of a resin composition.

Then, 2.5 mL of the resin composition precursor was poured into a polytetrafluoroethylene mold measuring 50 mm×50 mm×1 mm, and heated for 24 hours at 60° C. to cure the resin precursor, whereupon a solid neutron scintillator comprising the resin composition containing the eutectic particles of the present invention was obtained. The shape of the neutron scintillator was a sheet measuring 50 mm×50 mm×1 mm, and the volume fraction of the eutectic particles in the resin composition was 40%.

<Production and Characterization of Neutron Detector>

The response characteristics of the resulting neutron scintillator with respect to neutrons were evaluated by the following method:

The 50 mm×50 mm surface of the neutron scintillator was used as a light emission surface, and the light emission surface was bonded to a light detection surface of a photomultiplier tube (R877UVHA of Hamamatsu Photonics K.K.) by use of optical grease. Then, a reflecting material comprising an unbaked polytetrafluoroethylene sheet was installed on surfaces of the neutron scintillator other than its light emission surface.

A power source was connected to the photomultiplier tube. As a signal readout circuit, a preamplifier, a shaping amplifier, and a multichannel pulse height analyzer were connected to the photomultiplier tube to produce a neutron detector.

The neutron detector was covered with a light shielding material made of a black vinyl sheet so that light from the outside would not enter the light detection surface of the photomultiplier tube. Then, Cf-252 having a radioactivity of 2.4 MBq was placed at the center of 20 cm square cubic high-density polyethylene. A neutron from the Cf-252 was moderated by the high-density polyethylene, and the neutron detector was irradiated with the neutron.

To measure scintillation light emitted from the neutron scintillator, a high voltage of 1,000 V was applied from a power supply line to the photomultiplier tube, and an electrical signal outputted from the photomultiplier tube was read out from a signal output line. The electric signal from the photomultiplier tube is a pulsed signal reflecting scintillation light, and the pulse height of the pulse represents the emission intensity of scintillation light. The electric signal outputted from the photomultiplier tube was inputted to the shaping amplifier via the preamplifier, and shaped and amplified by the shaping amplifier. Then, this signal was inputted to the multichannel pulse height analyzer for analysis, to prepare a pulse height spectrum.

Then, a pulse height spectrum was prepared in the same manner as above, except that Co-60 having a radioactivity of 0.8 MBq was placed 10 cm away from the neutron scintillator to apply a γ-ray from the Co-60, instead of a neutron.

Figure 2:
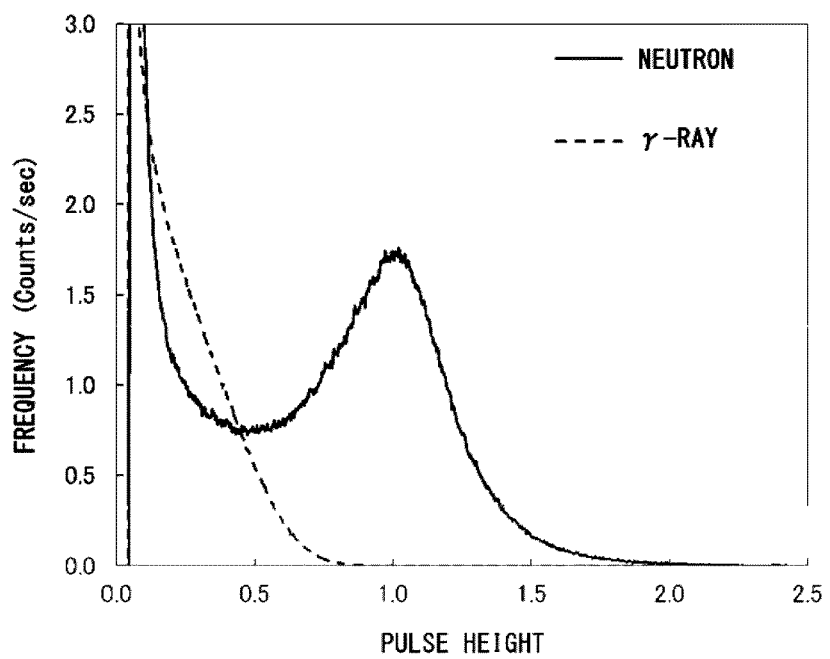
FIG. 2 shows pulse height spectra obtained in Example 1.

The resulting pulse height spectra are shown in FIG. 2. A solid line and a dashed line in FIG. 2 represent the pulse height spectra under neutron irradiation and γ-ray irradiation, respectively. In the pulse height spectrum, the abscissa axis shows a relative value when the pulse height of a neutron peak was taken as 1. In FIG. 2, a clear neutron peak can be confirmed, whereas the pulse height of the electric signal produced by the incidence of a γ-ray is smaller than the pulse height of the neutron peak. Thus, it is found that the neutron detector can easily discriminate between a γ-ray and a neutron.

<Evaluation of Uniformity of Neutron Scintillator>

The aforementioned neutron scintillator measuring 50 mm×50 mm×1 mm was chopped to 100 small pieces measuring 5 mm×5 mm×1 mm. Using each small piece, a pulse height spectrum under neutron irradiation was prepared. The pulse height and area of the neutron peak in the pulse height spectrum were examined for distribution. The pulse height and area of the neutron peak serve as indices to the emission intensity and neutron detection efficiency, respectively, of the neutron scintillator.

The standard deviations of the pulse height and area of the neutron peak were 5.1% and 3.0%, respectively, demonstrating that the neutron scintillator of the present invention had uniform characteristics at the respective sites, and was excellent in uniformity.

Comparative Example 1

A eutectic ingot was prepared in the same manner as in Example 1. This eutectic ingot was cut and polished to obtain a plate-shaped neutron scintillator measuring 50 mm×50 mm×1 mm. The neutron scintillator underwent cracking during the cooling process of the eutectic ingot.

The neutron scintillator was chopped to 100 small pieces measuring 5 mm×5 mm×1 mm. Using each small piece, a pulse height spectrum under neutron irradiation was prepared in the same manner as in Example 1. The pulse height and area of the neutron peak in the pulse height spectrum were examined for distribution. As a result, the standard deviations of the pulse height and area of the neutron peak were 11% and 4.8%, respectively, demonstrating that the neutron scintillator of this Comparative Example had non-uniform characteristics at the respective sites, and was problematic in terms of uniformity, as compared with the neutron scintillator of the present invention shown in Example 1.

Example 2

<Production of Eutectic Particles>

In the present Example, Ce-containing $SrF_2$ was used as an inorganic fluorescent material, and eutectic particles of LiF and the inorganic fluorescent material were produced. The emission wavelength of the inorganic fluorescent material was 330 nm.

A eutectic ingot was prepared in the same manner as in Example 1, except that 150 g (6.0 mol) of LiF, 180 g (1.4 mol) of $SrF_2$, and 1.4 g (0.007 mol) of $CeF_3$, as starting materials, were mixed to prepare a starting mixture. The eutectic ingot was ground to obtain eutectic particles. In the starting mixture, the mixing ratio between LiF and $SrF_2$ was $LiF/SrF_2=81/19$ (mol/mol), which was the mixing ratio of a eutectic composition. The melting point of the starting mixture having the eutectic composition was 770° C. The amount of Ce, as a luminescent center element, incorporated into $SrF_2$ was 0.5 mol % based on $SrF_2$.

The resulting eutectic particles were observed for a BSE compositional image with the use of a scanning electron microscope (SEM). The eutectic particles had a multilayer structure having layered LiF and layered $SrF_2$ stacked alternately, and the thickness of the layered LiF was about 1 μm. The resulting eutectic particles were ground, and the resulting powder was subjected to powder X-ray diffraction measurement to identify crystal phases. Diffraction peaks ascribed to LiF and $SrF_2$ were confirmed, finding that the eutectic was one composed of LiF and $SrF_2$.

<Preparation of Neutron Scintillator>

In the present Example, a methyl phenyl silicone resin having a refractive index of 1.45 at 330 nm, the emission wavelength of the inorganic fluorescent material, was used as a resin. The refractive index of the inorganic fluorescent material at 330 nm was 1.45, and the ratio of the refractive index of the resin to the refractive index of the inorganic fluorescent material was 1.00. This refractive index is a value measured with a refractometer, and a value measured at room temperature, the operating temperature of the neutron scintillator in the present Example, as described earlier. The resin is composed of two liquids, a liquid A and a liquid B. The two liquids in equal amounts are mixed to prepare a resin precursor, and then the resin precursor can be cured by heating. The internal transmittance of the resin was 87%/cm at 330 nm, the emission wavelength of the inorganic fluorescent material.

The aforementioned eutectic particles (6.6 g; 2.0 mL) were added to 3.0 mL of the resin precursor of the methyl phenyl silicone resin, the mixture of equal amounts of the liquid A and the liquid B. These materials were thoroughly mixed using a stirring rod, and then air bubbles occurring in the mixture during the mixing operation were defoamed using a vacuum defoaming machine to obtain a precursor of a resin composition.

Then, 2.5 mL of the resin composition precursor was poured into a polytetrafluoroethylene mold measuring 50 mm×50 mm×1 mm, and heated for 24 hours at 60° C. to cure the resin precursor, to obtain a neutron scintillator comprising the resin composition containing the eutectic particles of the present invention. The shape of the neutron scintillator was a sheet measuring 50 mm×50 mm×1 mm, and the volume fraction of the eutectic particles in the resin composition was 40%.

<Production and Characterization of Neutron Detector>

Figure 3:
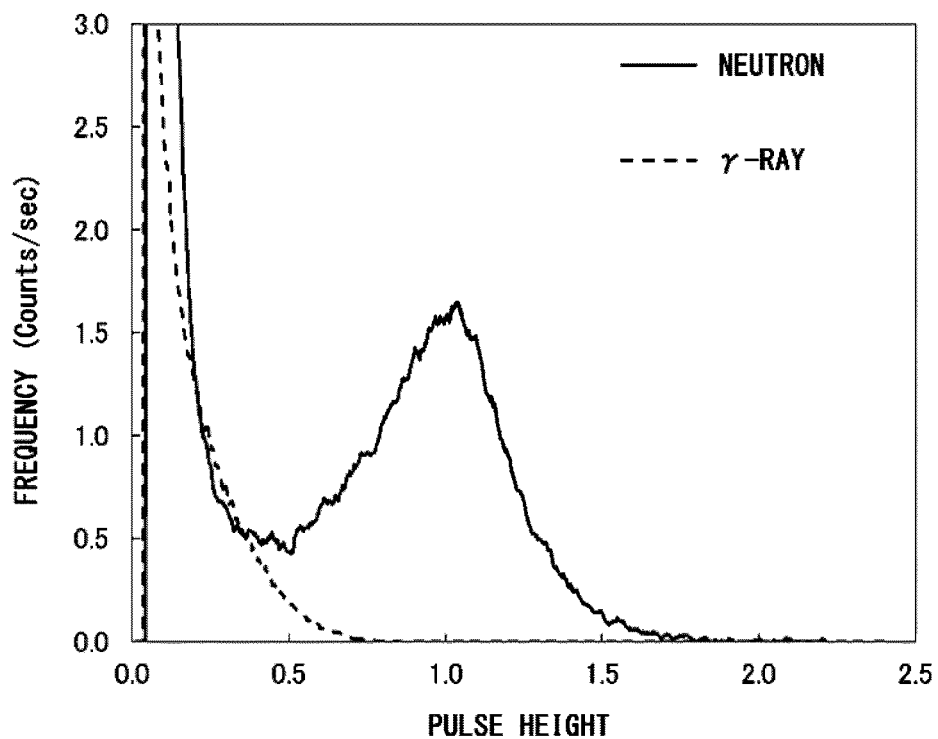
FIG. 3 shows pulse height spectra obtained in Example 2.

The response characteristics of the resulting neutron scintillator with respect to neutrons were evaluated in the same manner as in Example 1. The resulting pulse height spectra are shown in FIG. 3. A solid line and a dashed line in FIG. 3 represent the pulse height spectra under neutron irradiation and γ-ray irradiation, respectively. In the pulse height spectrum, the abscissa axis shows a relative value when the pulse height of a neutron peak was taken as 1. In FIG. 3, a clear neutron peak can be confirmed, whereas the pulse height of the electric signal produced by the incidence of a γ-ray is smaller than the pulse height of the neutron peak. Thus, it is found that a γ-ray and a neutron can be easily discriminated.

<Evaluation of Uniformity of Neutron Scintillator>

The aforementioned neutron scintillator was chopped to 100 small pieces measuring 5 mm×5 mm×1 mm. Using each small piece, a pulse height spectrum under neutron irradiation was prepared. The pulse height and area of the neutron peak in the pulse height spectrum were examined for distribution. As a result, the standard deviations of the pulse height and area of the neutron peak were 6.2% and 2.8%, respectively, demonstrating that the neutron scintillator of the present invention had uniform characteristics at the respective sites, and was excellent in uniformity.

Comparative Example 2

A eutectic ingot was prepared in the same manner as in Example 2. This eutectic ingot was cut and polished to obtain a plate-shaped neutron scintillator measuring 50 mm×50 mm×1 mm. The neutron scintillator underwent cracking during the cooling process of the eutectic ingot.

The neutron scintillator was chopped to 100 small pieces measuring 5 mm×5 mm×1 mm. Using each small piece, a pulse height spectrum under neutron irradiation was prepared in the same manner as in Example 2. The pulse height and area of the neutron peak in the pulse height spectrum were examined for distribution. As a result, the standard deviations of the pulse height and area of the neutron peak were 11% and 5.8%, respectively, demonstrating that the neutron scintillator of this Comparative Example had non-uniform characteristics at the respective sites, and was problematic in terms of uniformity, in comparison with the neutron scintillator of the present invention shown in Example 2.

Example 3

<Production of Eutectic Particles>

In the present Example, Tb-containing $LiYF_4$ was used as an inorganic fluorescent material, and eutectic particles of LiF and the inorganic fluorescent material were produced. The inorganic fluorescent material was $Li(Y0.9Tb0.1)F_4$ formed by substituting 10% of Y of $LiYF_4$ by Tb. The emission wavelength of the inorganic fluorescent material was 550 nm.

A eutectic ingot was prepared in the same manner as in Example 1, except that 150 g (6.0 mol) of LiF, 190 g (1.3 mol) of $YF_3$, and 31 g (0.14 mol) of $TbF_3$, as starting materials, were mixed to prepare a starting mixture. The eutectic ingot was ground to obtain eutectic particles. In the starting mixture, the mixing ratio between LiF and $Li(Y0.9Tb0.1)F_4$ was $LiF/Li(Y0.9Tb0.1)F_4=61/39$ (mol/mol), which was the mixing ratio of a eutectic composition. The melting point of the starting mixture having the eutectic composition was 710° C. The amount of Tb, as a luminescent center element, incorporated into $LiYF_4$ was 10 mol % based on $LiYF_4$.

The resulting eutectic particles were observed for a BE compositional image with the use of a scanning electron microscope (SEM). The eutectic particles had a honeycomb structure having many LiF cylinders arranged in a matrix comprising $LiYF_4$, and the diameter of the cylindrical LiF was about 1 μm.

The resulting eutectic particles were ground, and the resulting powder was subjected to powder X-ray diffraction measurement to identify crystal phases. Diffraction peaks ascribed to LiF and Li(Y0.9Tb0.1) $F_4$ were confirmed, finding that the eutectic was one composed of LiF and Li(Y0.9Tb0.1)$F_4$.

<Preparation of Neutron Scintillator>

In the present Example, a methyl phenyl silicone resin having a refractive index of 1.45 at 550 nm, the emission wavelength of the inorganic fluorescent material, was used as a resin. The refractive index of the inorganic fluorescent material at 550 nm was 1.45, and the ratio of the refractive index of the resin to the refractive index of the inorganic fluorescent material was 1.00. This refractive index is a value measured with a refractometer, and a value measured at room temperature, the operating temperature of the neutron scintillator in the present Example, as described earlier.

The resin is composed of two liquids, a liquid A and a liquid B. The two liquids in equal amounts are mixed to prepare a resin precursor, and then the resin precursor can be cured by heating. The internal transmittance of the resin was 96%/cm at 550 nm, the emission wavelength of the inorganic fluorescent material.

The aforementioned eutectic particles (7.3 g; 2.0 mL) were added to 3.0 mL of the resin precursor of the methyl phenyl silicone resin, the mixture of equal amounts of the liquid A and the liquid B. These materials were thoroughly mixed using a stirring rod, and then air bubbles occurring in the mixture during the mixing operation were defoamed using a vacuum defoaming machine to obtain a precursor of a resin composition.

Then, 2.5 mL of the resin composition precursor was poured into a polytetrafluoroethylene mold measuring 50 mm×50 mm×1 mm, and heated for 24 hours at 60° C. to cure the resin precursor, to obtain a neutron scintillator comprising the resin composition containing the eutectic particles of the present invention. The shape of the neutron scintillator was a sheet measuring 50 mm×50 mm×1 mm, and the volume fraction of the eutectic particles in the resin composition was 40%.

<Characterization of Neutron Scintillator>

The response characteristics of the resulting neutron scintillator with respect to neutrons were evaluated by the following method:

The 50 mm×50 mm surface of the neutron scintillator was used as a light emission surface, and the light emission surface was installed to face an entrance slit of a spectrophotometer. The spectrophotometer was composed of a diffraction grating and a CCD detector. Then, a reflecting material comprising an unbaked polytetrafluoroethylene sheet was installed on surfaces of the neutron scintillator other than its light emission surface.

The spectrophotometer was covered with a light shielding material made of a black vinyl sheet so that light from the outside would not enter the spectrophotometer. Then, the neutron scintillator was irradiated with a neutron moderated by high-density polyethylene.

To measure scintillation light emitted from the neutron scintillator, the scintillation light was dispersed using the diffraction grating of the spectrophotometer, and the emission intensities at the respective wavelengths were measured with the CCD detector, to prepare an emission spectrum.

Figure 4:
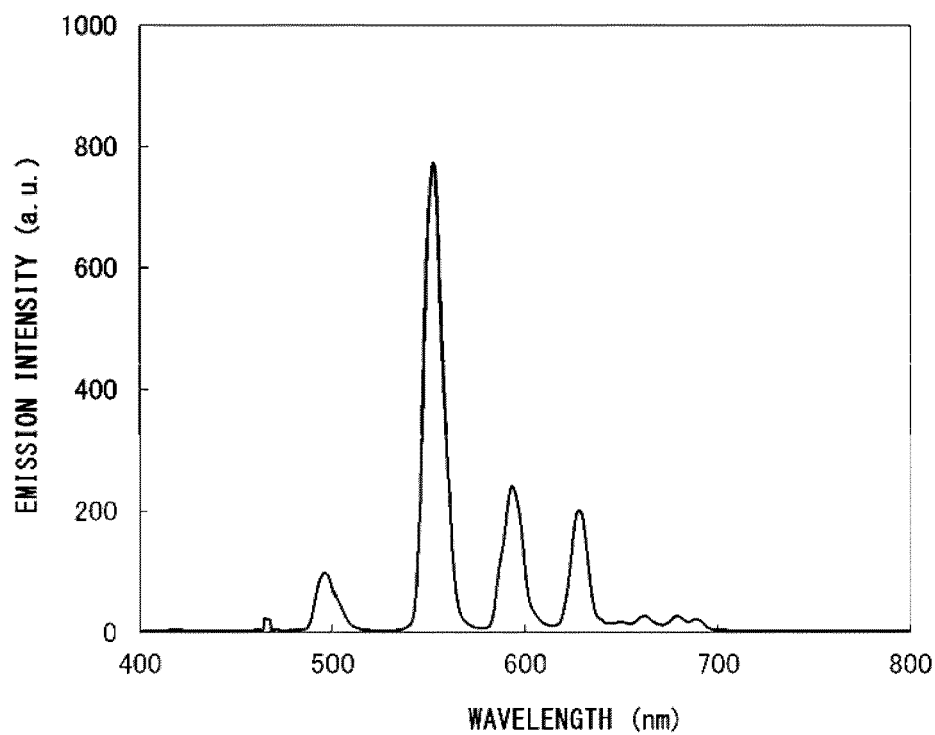
FIG. 4 shows an emission spectrum obtained in Example 3.

The resulting spectrum is shown in FIG. 4. From FIG. 4, it is found that the neutron scintillator of the present invention shows very high emission intensities and, in combination with a photodetector such as the CCD detector, can provide an integral type neutron detector.

<Evaluation of Uniformity of Neutron Scintillator>

The aforementioned neutron scintillator was chopped to 100 small pieces measuring 5 mm×5 mm×1 mm. Using each small piece, an emission spectrum was prepared in the same manner as in Example 3, and the emission intensity in the emission spectrum was examined for distribution. As a result, the standard deviation of the emission intensity was 2.5%, demonstrating that the neutron scintillator of the present invention had uniform characteristics at the respective sites, and was excellent in uniformity.

Comparative Example 3

A eutectic ingot was prepared in the same manner as in Example 3. This eutectic ingot was cut and polished to obtain a plate-shaped neutron scintillator measuring 50 mm×50 mm×1 mm. The neutron scintillator underwent cracking during the cooling process of the eutectic ingot.

The neutron scintillator was chopped to 100 small pieces measuring 5 mm×5 mm×1 mm. Using each small piece, an emission spectrum under neutron irradiation was prepared in the same manner as in Example 3. The emission intensity in the emission spectrum was examined for distribution. As a result, the standard deviation of the emission intensity was 7.8%, demonstrating that the neutron scintillator of this Comparative Example had nonuniform characteristics at the respective sites, and was problematic in terms of uniformity, in comparison with the neutron scintillator of the present invention shown in Example 3.

Example 4

In the present Example, a neutron scintillator comprising a resin composition containing eutectic particles and a resin, and further containing, in addition to them, particles composed of $CaF_2$ as filler particles; and a neutron detector using the neutron scintillator were produced, and evaluated.

<Production of Eutectic Particles>

In the same manner as in Example 1, Eu-containing $CaF_2$ was used as an inorganic fluorescent material, and eutectic particles of LiF and the inorganic fluorescent material were produced.

<Preparation of Neutron Scintillator Containing Filler>

A $CaF_2$ ingot melted and solidified beforehand was coarsely ground into an indefinite shape about 2 cm square by means of a hammer, and then ground using a hammer mill. The resulting ground matter was classified by dry classification to collect particles passing through a 100 μm sieve, thereby obtaining the above filler particles composed of $CaF_2$.

A solid neutron scintillator comprising a resin composition containing the eutectic particles of the present invention and filler particles was obtained in the same manner as in Example 1, except that 5.7 g (2.0 mL) of the above eutectic particles and 3.2 g (1.0 mL) of the filler particles were added to 2.0 mL of the resin precursor of a methyl phenyl silicone resin which was the mixture of equal amounts of the liquid A and the liquid B.

The shape of the neutron scintillator was a sheet measuring 50 mm×50 mm×1 mm, and the volume fraction of the eutectic particles in the resin composition was 40%. The volume ratio of the filler particles to the eutectic particles was 50 parts by volume with respect to 100 parts by volume of the eutectic particles. The refractive index of the filler particles at 430 nm, the emission wavelength of the inorganic fluorescent material, was 1.44, and the ratio of the refractive index of the resin to the refractive index of the filler particles was 1.01.

<Characterization of Neutron Scintillator>

Figure 5:
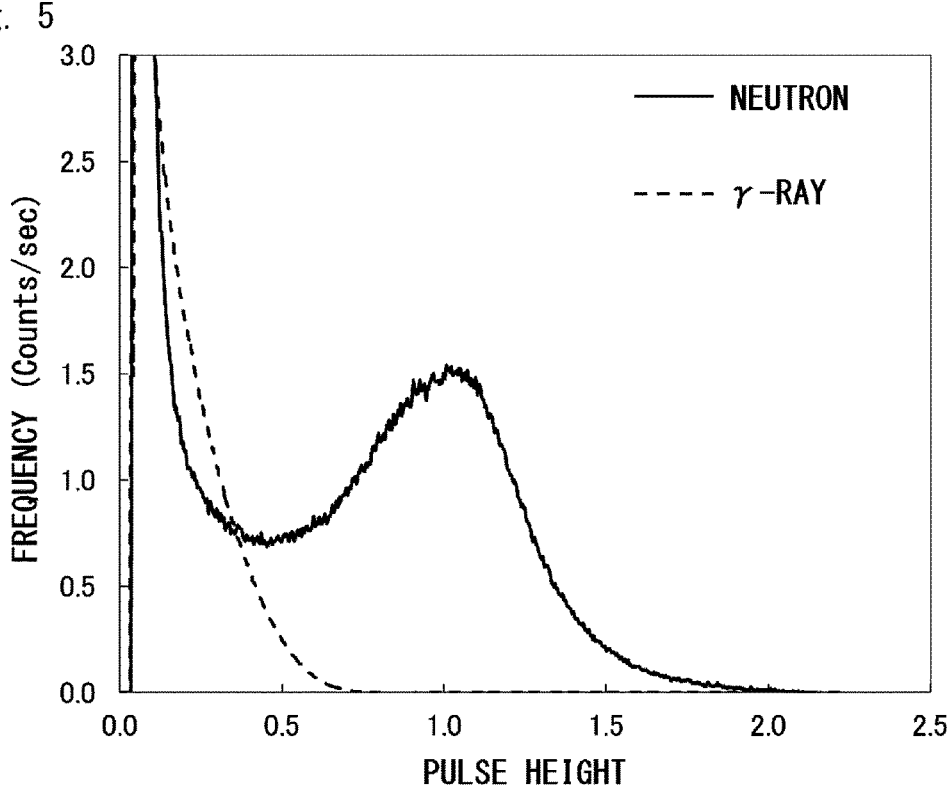
FIG. 5 shows pulse height spectra obtained in Example 4.

The response characteristics of the resulting neutron scintillator with respect to neutrons were evaluated in the same manner as in Example 1. The resulting pulse height spectra are shown in FIG. 5. A solid line and a dashed line in FIG. 5 represent the pulse height spectra under neutron irradiation and γ-ray irradiation, respectively. In the pulse height spectrum, the abscissa axis shows a relative value when the pulse height of a neutron peak was taken as 1. From FIG. 5, a clear neutron peak can be confirmed, whereas the pulse height of an electric signal produced by the incidence of a γ-ray is smaller than the pulse height of the neutron peak. Thus, it is found that a γ-ray and a neutron can be easily discriminated.

<Evaluation of Uniformity of Neutron Scintillator>

The above neutron scintillator was chopped to 100 small pieces measuring 5 mm×5 mm×1 mm. Using each small piece, a pulse height spectrum under neutron irradiation was prepared in the same manner as in Example 1. The pulse height and area of the neutron peak in the pulse height spectrum were examined for distribution. The standard deviations of the pulse height and area of the neutron peak were 6.0% and 2.8%, respectively, demonstrating that the neutron scintillator of the present invention had uniform characteristics at the respective sites, and was excellent in uniformity.

Example 5

In the present Example, a neutron scintillator containing eutectic particles and a resin, and further containing, in addition to them, 1,4-bis(5-phenyl-2-oxazolyl)benzene as a neutron insensitive phosphor; and a neutron detector using the neutron scintillator were produced, and evaluated.

<Production of Eutectic Particles>

In the same manner as in Example 1, Eu-containing $CaF_2$ was used as an inorganic fluorescent material, and eutectic particles of LiF and the inorganic fluorescent material were produced.

<Preparation of Neutron Scintillator Containing Neutron Insensitive Phosphor>

A neutron scintillator was produced in the same manner as in Example 1, except that 5.7 g (2.0 mL) of the above eutectic particles were added to 3.0 mL of the resin precursor of a methyl phenyl silicone resin having equal amounts of the liquid A and the liquid B mixed therein beforehand and then incorporating 0.02 mass % of 1,4-bis(5-phenyl-2-oxazolyl)benzene.

<Characterization of Neutron Scintillator>

Using the neutron scintillator, a neutron detector was produced in the same manner as in Example 1. For the purpose of observing the waveform of a signal outputted from the photomultiplier tube, however, an oscilloscope was directly connected to the photomultiplier tube, instead of the signal readout circuit comprising the preamplifier, the shaping amplifier, and the multichannel pulse height analyzer.

Figure 6:
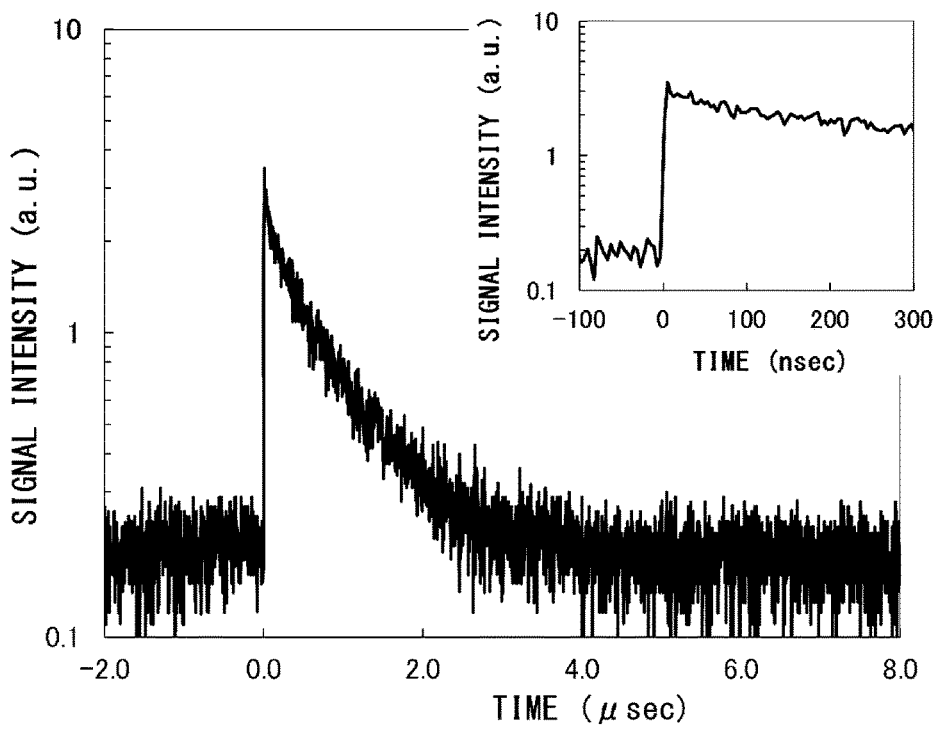
FIG. 6 is a view showing a signal waveform generated when a neutron detector obtained in Example 5 was irradiated with neutrons.
Figure 7:
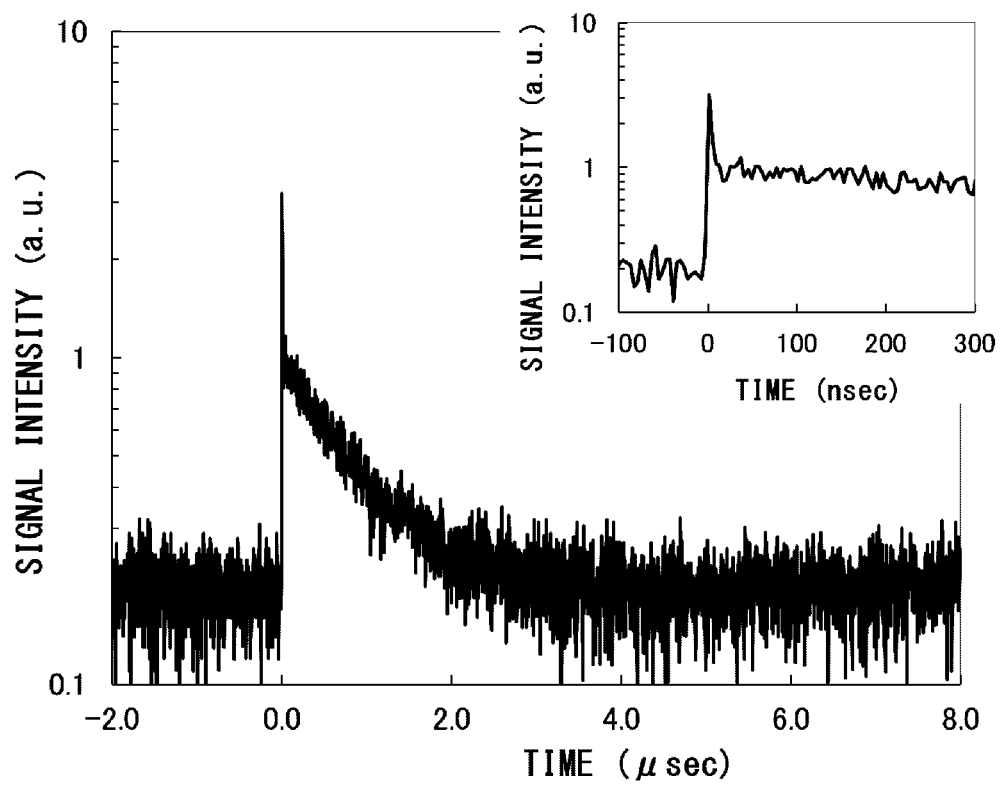
FIG. 7 is a view showing a signal waveform generated when the neutron detector obtained in Example 5 was irradiated with γ-rays.

The neutron detector was irradiated with each of neutrons and γ-rays in the same manner as in Example 1, and the waveforms of signals outputted from the photomultiplier tube were recorded by the oscilloscope. The signal waveforms obtained under the neutron irradiation or the γ-ray irradiation are shown in FIGS. 6 and 7, respectively. An upper right inset in each of the drawings is an enlarged view at times close to time 0.

FIG. 6 shows that when neutrons are incident, only long-life fluorescences from the eutectic particles are observed. FIG. 7, on the other hand, shows that when γ-rays are incident, short-life fluorescence from the neutron insensitive phosphor is observed in addition to long-life fluorescence from the eutectic particles. Hence, a neutron detector particularly excellent in n/γ discrimination ability can be obtained by providing the neutron detector according to the present embodiment with the above-mentioned waveform analysis mechanism.

The invention claimed is:

1. A neutron scintillator comprising a resin composition containing a resin and eutectic particles, wherein
   the resin has an internal transmittance of 10%/cm or more at an emission wavelength of the eutectic particles,
   the eutectic particles are composed of lithium fluoride (LiF) and an inorganic fluorescent material, and
   an equal specific surface area sphere equivalent diameter of the eutectic particles is in a range of 50 to 1000 µm.

2. The neutron scintillator according to claim 1, wherein the inorganic fluorescent material is an inorganic material containing at least one lanthanoid element selected from the group consisting of cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), and ytterbium (Yb).

3. The neutron scintillator according to claim 2, wherein a ratio ($n_1/n_2$) of a refractive index ($n_1$) of the resin to a refractive index ($n_2$) of the inorganic fluorescent material is in a range of 0.90 to 1.10.

4. The neutron scintillator according to claim 2, which further contains filler particles.

5. The neutron scintillator according to claim 2, which further contains a neutron insensitive phosphor.

6. A neutron detector comprising the neutron scintillator according to claim 2 and a photodetector.

7. The neutron scintillator according to claim 1, wherein a ratio ($n_1/n_2$) of a refractive index ($n_1$) of the resin to a refractive index ($n_2$) of the inorganic fluorescent material is in a range of 0.90 to 1.10.

8. The neutron scintillator according to claim 7, which further contains filler particles.

9. The neutron scintillator according to claim 7, which further contains a neutron insensitive phosphor.

10. A neutron detector comprising the neutron scintillator according to claim 7 and a photodetector.

11. The neutron scintillator according to claim 1, which further contains filler particles.

12. The neutron scintillator according to claim 11, wherein
    a ratio ($n_1/n_3$) of a refractive index ($n_1$) of the resin to a refractive index ($n_3$) of the filler particles is in a range of 0.90 to 1.10.

13. The neutron scintillator according to claim 12, which further contains a neutron insensitive phosphor.

14. A neutron detector comprising the neutron scintillator according to claim 12 and a photodetector.

15. The neutron scintillator according to claim 11, which further contains a neutron insensitive phosphor.

16. A neutron detector comprising the neutron scintillator according to claim 11 and a photodetector.

17. The neutron scintillator according to claim 1, which further contains a neutron insensitive phosphor.

18. A neutron detector comprising the neutron scintillator according to claim 17 and a photodetector.

19. A neutron detector comprising the neutron scintillator according to claim 1 and a photodetector.

20. The neutron detector according to claim 19, wherein the neutron scintillator and the photodetector are optically connected together by a wavelength shifter composed of a wavelength shifting fiber or a wavelength shifting sheet.

* * * * *